United States Patent
Al-Garni et al.

(10) Patent No.: US 9,168,474 B2
(45) Date of Patent: Oct. 27, 2015

(54) INERTIAL PARTICLE SEPARATOR WITH HEAT EXCHANGE

(71) Applicant: KING FAHD UNIVERSITY OF PETROLEUM AND MINERALS, Dhahran (SA)

(72) Inventors: Ahmed Z. Al-Garni, Dhahran (SA); Mohammed Aves, Hyderabad (IN)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 269 days.

(21) Appl. No.: 13/927,993

(22) Filed: Jun. 26, 2013

(65) Prior Publication Data

US 2015/0000235 A1  Jan. 1, 2015

(51) Int. Cl.
| | |
|---|---|
| B01D 46/18 | (2006.01) |
| B01D 45/12 | (2006.01) |
| B01D 45/16 | (2006.01) |
| B01D 45/14 | (2006.01) |
| B01D 45/08 | (2006.01) |
| B04C 5/13 | (2006.01) |

(52) U.S. Cl.
CPC ................. *B01D 45/12* (2013.01); *B01D 45/08* (2013.01); *B01D 45/14* (2013.01); *B01D 45/16* (2013.01); *B04C 5/13* (2013.01)

(58) Field of Classification Search
CPC ........ B01D 45/12; B01D 45/16; B01D 45/14; B01D 45/08; B04C 5/13
USPC ........... 55/456–457, 406–409, 400, 396, 447, 55/469; 95/288, 269–271, 35, 32, 29; 96/389
See application file for complete search history.

(56) References Cited

U.S. PATENT DOCUMENTS

| | | | |
|---|---|---|---|
| 3,528,218 A | 9/1970 | Garrett et al. | |
| 3,895,760 A | 7/1975 | Snyder | |
| 4,357,802 A | 11/1982 | Wahl, III et al. | |
| 4,799,623 A | 1/1989 | Bruchez, Jr. et al. | |
| 5,141,154 A | 8/1992 | Barcza | |

(Continued)

FOREIGN PATENT DOCUMENTS

EP           0 496 128 A1   7/1992

OTHER PUBLICATIONS

"Inertial Particle Separation Technology", Donaldson Company, Inc. 2010, 4 pages.

*Primary Examiner* — Dung H Bui
(74) *Attorney, Agent, or Firm* — Richard C. Litman

(57) ABSTRACT

The inertial particle separator with heat exchange is a system for separating particulate matter from a mixture of fluid and particles, such as, for example, oil mixtures, natural gas mixtures, or combinations thereof. A rotating pipe first receives the mixture and imparts a tangential velocity thereto. A first heat exchanger is in thermal communication with the rotating pipe for decreasing the temperature of the mixture. An inlet of a convergent-divergent nozzle is connected to an outlet of the rotating pipe for receiving the mixture. The convergent-divergent nozzle accelerates the mixture to a supersonic axial velocity. The accelerated mixture flows into a temperature-controlled pipe which is in thermal communication with a second heat exchanger for further decreasing the temperature of the mixture. The mixture then flows into a concentric diffuser, such that the particulate matter of the mixture is separated from the fluid of the mixture under centrifugal force acting thereon.

19 Claims, 1 Drawing Sheet

(56) References Cited

U.S. PATENT DOCUMENTS

| | | |
|---|---|---|
| 5,261,242 A | 11/1993 | Lardinois |
| 5,306,330 A | 4/1994 | Nasikas |
| 5,902,224 A | 5/1999 | Bloom |
| 6,513,345 B1 | 2/2003 | Betting et al. |
| 6,962,199 B1 | 11/2005 | Willink |
| 7,096,929 B2 | 8/2006 | Clarksean |
| 7,922,784 B2 | 4/2011 | Saeed et al. |
| 2004/0118102 A1 | 6/2004 | Child |
| 2008/0179039 A1 | 7/2008 | Moilala et al. |
| 2010/0077752 A1* | 4/2010 | Papile ............ 60/641.8 |
| 2011/0266397 A1 | 11/2011 | Smith |
| 2011/0296985 A1* | 12/2011 | Buhrman et al. .......... 95/34 |
| 2012/0097620 A1* | 4/2012 | Blum .............. 210/764 |
| 2012/0190528 A1 | 7/2012 | Bloom |
| 2012/0211432 A1 | 8/2012 | Lean et al. |
| 2013/0228076 A1* | 9/2013 | Balepin et al. ............ 95/271 |

\* cited by examiner

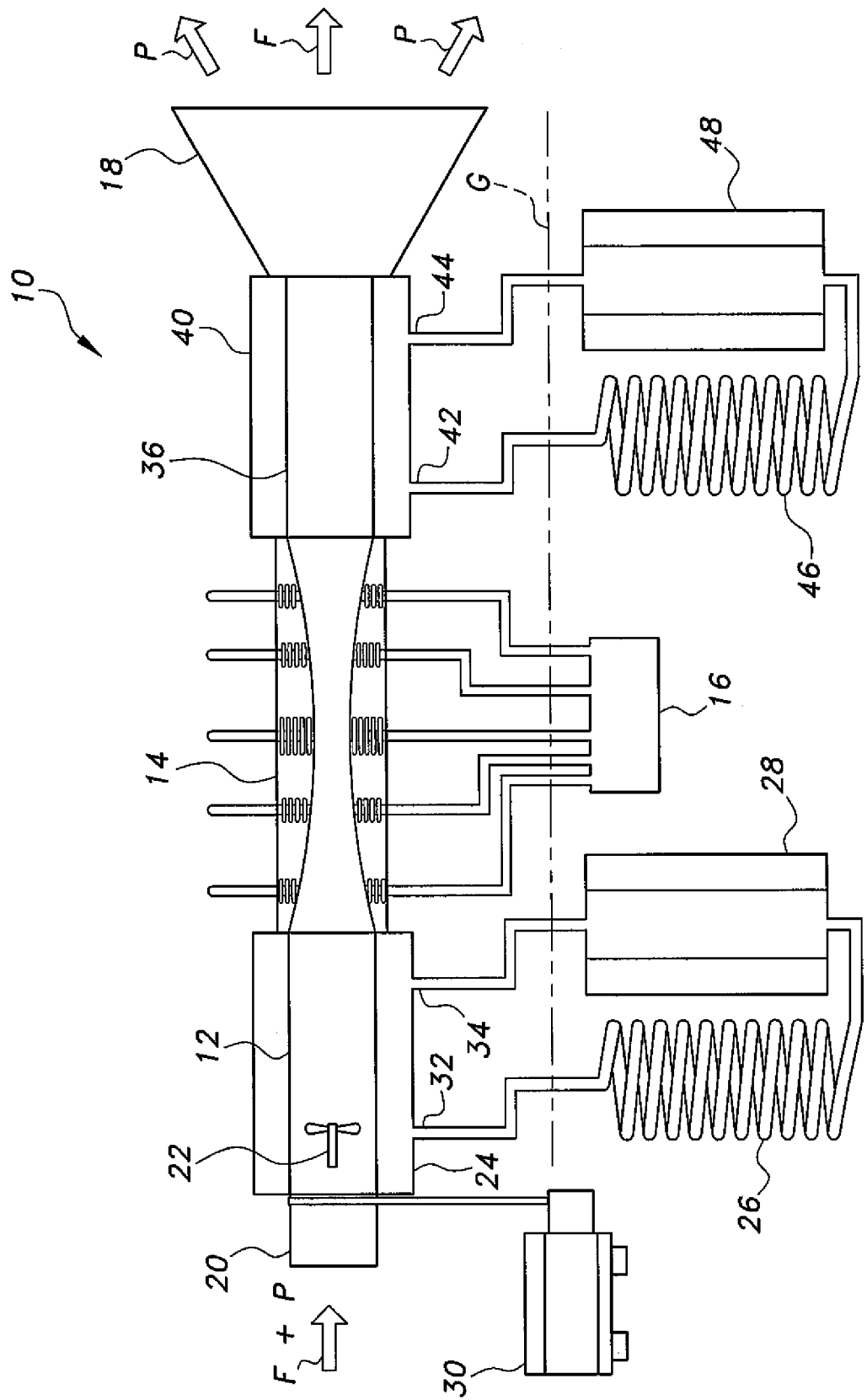

INERTIAL PARTICLE SEPARATOR WITH HEAT EXCHANGE

BACKGROUND OF THE INVENTION

1. Field of the Invention

The present invention relates to the separation of particulate matter from fluids, such as oil, natural gas and the like, and particularly to an inertial particle separator with temperature control via heat exchange.

2. Description of the Related Art

Particulate matter suspended in a fluid, such as oil, natural gas or the like, is affected by a variety of forces. The net sum of these forces dictates how the particulate matter behaves in the fluid. For example, particles may settle due to the force of gravity or inertial forces, or remain suspended due to the effects of resistance and diffusion. The particulate matter may collect or deposit on surfaces due to thermophoresis or static charge. For sub-micrometer sized particulate matter, non-gravitational forces are more significant than the force of gravity. These physical phenomena can be used to manipulate the presence of particulate matter to obtain certain desirable effects.

Filtration media are designed and constructed so that particulate matter is collected or trapped by the medium. A specific filtration media's ability to collect the desired particulate matter is a function of several physical characteristics that are designed into the filtration medium. One example of a physical characteristic is pore size of the media.

Inertial separators are frequently used for gas or liquid cleaning. In these devices, the fluid having the particulate matter is made to bend sharply. The higher density particles, which have difficulty making the sharp bend, are thrown to the outside of the bend, and are thusly concentrated in a portion of the fluid flow. The flow is then split into a clean and a dirty portion. Various cyclones, centrifuges, inertial separators, virtual impactors and the like are used for this purpose, often to reject undesired particles such as dirt from a fluid flow, but also to concentrate and collect desired particulates. In general, these devices work well to remove particulate, but they add undesirable restriction to the flow. Further, and importantly, they require a great deal of energy in order to force the fluid mixtures through the various bends of the system. It would be desirable to be able to control the pressure of the fluid flow without such large energy expenditures.

Thus, an inertial particle separator with heat exchange addressing the aforementioned problems is desired.

SUMMARY OF THE INVENTION

The inertial particle separator with heat exchange is a system for separating particulate matter from a mixture of fluid and particles, such as, for example, oil mixtures, natural gas mixtures, or combinations thereof. The inertial particle separator with heat exchange includes a rotating pipe having an inlet and an outlet, with the inlet receiving the mixture of a fluid and particulate matter. Driven rotation of the rotating pipe imparts a tangential velocity to the mixture. A first heat exchanger is in thermal communication with the rotating pipe for decreasing a first temperature of the mixture when the mixture is flowing through the rotating pipe.

A convergent-divergent nozzle having an inlet and an outlet is further provided. The inlet thereof is connected to the outlet of the rotating pipe for receiving the mixture. The convergent-divergent nozzle accelerates the mixture to a supersonic axial velocity. Preferably, the convergent-divergent nozzle has a throat having a variable contour. The outlet of the convergent-divergent nozzle is connected to an inlet of a temperature-controlled pipe.

A second heat exchanger is in thermal communication with the temperature-controlled pipe for decreasing a second temperature of the mixture when the mixture is flowing therethrough. An inlet of a concentric diffuser is connected to an outlet of the temperature-controlled pipe for receiving the mixture. The concentric diffuser includes at least one outer radial portion and at least one inner radial portion, such that the particulate matter of the mixture is separated from the fluid of the mixture under centrifugal force thereon, with the particulate matter passing through the at least one outer radial portion and the fluid passing through the at least one inner radial portion.

Power to drive rotation of the rotating pipe and operate the heat exchangers is preferably provided by renewable sources of energy, such as through solar power and/or wind power. These alternative power sources may be directly interconnected with a rotational drive system and the heat exchangers, or may be used to charge and recharge one or more storage batteries connected thereto.

These and other features of the present invention will become readily apparent upon further review of the following specification.

BRIEF DESCRIPTION OF THE DRAWINGS

The sole drawing FIGURE diagrammatically illustrates an inertial particle separator with heat exchange according to the present invention.

Unless otherwise indicated, similar reference characters denote corresponding features consistently throughout the attached drawing.

DETAILED DESCRIPTION OF THE PREFERRED EMBODIMENTS

As shown in the sole drawing FIGURE, a mixture of a fluid F with suspended particulate matter P enters the inertial particle separator 10 through an inlet 20. The inlet 20 feeds the mixture into a rotating pipe 12. A turbine 22 or the like may be mounted within the entrance of rotating pipe 12 to draw the mixture into the rotating pipe 12 and impart axial momentum thereto. The rotating pipe 12 may be driven to rotate about its axis by any suitable rotational drive, such as motor 30 or the like, along with any suitable associated drive system. The rotation of the pipe 12 imparts a tangential (i.e., circumferential) velocity to the fluid. This increase in velocity decreases pressure within the fluid stream. The decrease in pressure causes a subsequent and proportional decrease in temperature in the fluid. Due to centrifugal force on the particulate matter P, the particles P are driven outwardly along the radial direction, and the decrease in temperature promotes condensation of the particulate matter.

Further cooling of the fluid mixture within the pipe 12 is caused by heat exchange via a phase change fluid, which is contained within a concentric outer pipe 24, forming a concentric, annular chamber, with the phase change fluid being held between the concentric outer pipe 24 and an outer surface of the rotating pipe 12. Preferably, the concentric outer pipe 24 is formed from a thermally insulating material. As shown in the sole FIGURE, the phase change fluid is driven through an outlet 32 into a heat exchange coil 26, which is preferably buried beneath the ground G. The heated phase change fluid, which drew thermal energy from the fluid mixture within pipe 12, releases thermal energy into the ground G through the thermally conductive walls of coil 26. The cooled fluid is then further cooled by passing through a phase change material heat exchanger 28, before re-entering the outer concentric pipe 24 via inlet 34. It should be understood that any suitable type of phase change material heat exchanger may be utilized. Examples of such heat exchangers are shown in U.S. Pat. No. 7,096,929 B2 and U.S. Patent Application Publication No. US 2008/0179039 A1, each of which is hereby incorporated by reference in its entirety. The phase change material heat exchanger 28 is also preferably buried beneath the ground G. Once the tangential velocity has been imparted to the fluid mixture, and the temperature thereof lowered, the mixture flows into a variable convergent-divergent nozzle 14.

Convergent-divergent nozzles are well known in the art, particularly in rocket and jet engines. The high nozzle pressure ratios of conventional convergent nozzles often cause the pressure of exhaust exiting the engine to exceed the pressure of the surrounding air, thus reducing efficiency by causing much of the expansion to take place downstream of the nozzle itself. Thus, some engines (most notably in rockets) incorporate a convergent-divergent nozzle, which causes more of the exhaust to expand against the inside of the nozzle. However, unlike the fixed convergent-divergent nozzle used on a conventional rocket motor, those on turbojet engines must have a variable geometry to cope with the great variation in the nozzle pressure ratio that engine throttling creates. It should be understood that the variable convergent-divergent nozzle 14 may be any suitable type of variable convergent-divergent nozzle. Examples of such variable convergent-divergent nozzles are shown in U.S. Pat. Nos. 4,799,623 and 5,141,154, each of which is hereby incorporated by reference in its entirety. Preferably, the variable geometry of the throat of variable convergent-divergent nozzle 14 is controlled pneumatically, by pneumatic pump 16, although it should be understood that any source of power and control for selectively varying the throat geometry of variable convergent-divergent nozzle 14 may be utilized. The variable convergent-divergent nozzle 14 accelerates the fluid mixture to a supersonic axial velocity.

The accelerated fluid then flows into a temperature-controlled pipe 36, with the fluid pressure upon entry within the temperature-controlled pipe 36 matching the exit pressure from the variable convergent-divergent nozzle 14. A normal shock wave is formed at the intersection of the outlet of nozzle 14 and the inlet of temperature-controlled pipe 36, which causes the axial velocity of the fluid mixture to decrease, but does not change its tangential velocity.

The temperature of the fluid mixture within the temperature-controlled pipe 36 is decreased by a heat exchange process similar to that described above with respect to the rotating pipe 12. The temperature of the fluid mixture within the pipe 36 is decreased by heat exchange via a phase change fluid, similar to that described above, which is contained within a concentric outer pipe 40, with the phase change fluid being held between the concentric outer pipe 40 and an outer surface of the pipe 36. Preferably, the concentric outer pipe 40 is formed from a thermally insulating material. As shown in the sole FIGURE, the phase change fluid is driven through an outlet 42 into a heat exchange coil 46, similar to coil 26, which is preferably buried beneath the ground G. The heated phase change fluid, which drew thermal energy from the fluid mixture within pipe 36, releases thermal energy into the ground G through the thermally conductive walls of coil 46. The cooled fluid is then further cooled by passing through a phase change material heat exchanger 48, similar to heat exchanger 28, before re-entering the outer concentric pipe 40 via inlet 44. The decrease in temperature proportionally decreases the pressure of the fluid mixture within the temperature-controlled pipe 36. This fluid mixture then flows into a concentric diffuser 18 for separation of the particulate matter P from the fluid F.

Concentric diffusers are well known in the art, particularly in combustion turbine systems, where the concentric diffuser is connected to the outlet of the turbine for slowing down the flow of exhaust gases by providing an expanding flow path for the exhaust gases. It should be understood that concentric diffuser 18 may be any suitable type of concentric diffuser. An example of such a concentric diffuser is shown in U.S. Patent Application Publication US 2004/0118102 A1, which is hereby incorporated by reference in its entirety. The heavier particles P are separated from the flow when the fluid flow enters concentric diffuser 18. As the tangential velocity of the flow has not changed, the heavier particles P, under centrifugal force, are separated from the remaining fluid F into the largest-radius flow paths of concentric diffuser 18, as illustrated in the sole FIGURE. Here, the particles P may be collected, with the fluid F being extracted from the smaller-radius paths of concentric diffuser 18.

Power to drive motor 30 and turbine 22, along with operating heat exchangers 28, 48, is preferably provided by renewable sources of energy, such as through solar power and/or wind power. These alternative power sources may be directly interconnected with motor 30, turbine 22 and heat exchangers 28, 48, or may be used to charge and recharge one or more storage batteries connected thereto.

It is to be understood that the present invention is not limited to the embodiments described above, but encompasses any and all embodiments within the scope of the following claims.

We claim:

1. An inertial particle separator with heat exchange, comprising:

a rotating pipe having an inlet and an outlet, the inlet receiving a mixture of a fluid and particulate matter, wherein driven rotation of said rotating pipe imparts a tangential velocity to the mixture;

a first heat exchanger in thermal communication with said rotating pipe for decreasing a first temperature of the mixture when the mixture is flowing through said rotating pipe;

a convergent-divergent nozzle having an inlet and an outlet, the inlet thereof being connected to the outlet of said rotating pipe for receiving the mixture, wherein said convergent-divergent nozzle accelerates the mixture to a supersonic axial velocity, said convergent-divergent nozzle having a throat having a selectively and controllably variable geometry;

a temperature-controlled pipe having an inlet and an outlet, the inlet thereof being connected to the outlet of the convergent-divergent nozzle for receiving the mixture;

a second heat exchanger in thermal communication with said temperature-controlled pipe for decreasing a second temperature of the mixture when the mixture is flowing through said temperature-controlled pipe; and a concentric diffuser having an inlet and an outlet, the inlet thereof being connected to the outlet of said temperature-controlled pipe for receiving the mixture, wherein said concentric diffuser includes at least one outer radial portion and at least one inner radial portion, the particulate matter of the mixture being separated from the fluid of the mixture under centrifugal force thereon, the particulate matter passing through the at least one outer radial portion and the fluid passing through the at least one inner radial portion.

2. The inertial particle separator with heat exchange as recited in claim 1, wherein the variable geometry of the throat of the convergent-divergent nozzle is pneumatically driven.

3. The inertial particle separator with heat exchange as recited in claim 1, further comprising a turbine mounted within said rotating pipe.

4. The inertial particle separator with heat exchange as recited in claim 3, further comprising a first annular chamber mounted about the rotating pipe, a first phase change fluid being received therein, wherein said first heat exchanger is a phase change material heat exchanger in fluid communication with the first annular chamber.

5. The inertial particle separator with heat exchange as recited in claim 4, wherein said first heat exchanger is buried underground.

6. The inertial particle separator with heat exchange as recited in claim 5, further comprising a second annular chamber mounted about the temperature-controlled pipe, a second phase change fluid being received therein, wherein said second heat exchanger is a phase change material heat exchanger in fluid communication with the second annular chamber.

7. The inertial particle separator with heat exchange as recited in claim 6, wherein said second heat exchanger is buried underground.

8. An inertial particle separator with heat exchange, comprising:
- a rotating pipe having an inlet and an outlet, the inlet receiving a mixture of a fluid and particulate matter, wherein driven rotation of said rotating pipe imparts a tangential velocity to the mixture;
- a first heat exchanger in thermal communication with said rotating pipe for decreasing a first temperature of the mixture when the mixture is flowing through said rotating pipe;
- a convergent-divergent nozzle having an inlet and an outlet, the inlet thereof being connected to the outlet of said rotating pipe for receiving the mixture, wherein said convergent-divergent nozzle accelerates the mixture to a supersonic axial velocity, wherein said convergent-divergent nozzle has a throat having a selectively and controllably variable geometry;
- a temperature-controlled pipe having an inlet and an outlet, the inlet thereof being connected to the outlet of the convergent-divergent nozzle for receiving the mixture;
- a second heat exchanger in thermal communication with said temperature-controlled pipe for decreasing a second temperature of the mixture when the mixture is flowing through said temperature-controlled pipe; and
- a concentric diffuser having an inlet and an outlet, the inlet thereof being connected to the outlet of said temperature-controlled pipe for receiving the mixture, wherein said concentric diffuser includes at least one outer radial portion and at least one inner radial portion, the particulate matter of the mixture being separated from the fluid of the mixture under centrifugal force thereon, the particulate matter passing through the at least one outer radial portion and the fluid passing through the at least one inner radial portion.

9. The inertial particle separator with heat exchange as recited in claim 8, further comprising a turbine mounted within said rotating pipe.

10. The inertial particle separator with heat exchange as recited in claim 9, further comprising a first annular chamber mounted about the rotating pipe, a first phase change fluid being received therein, wherein said first heat exchanger is a phase change material heat exchanger in fluid communication with the first annular chamber.

11. The inertial particle separator with heat exchange as recited in claim 10, wherein said first heat exchanger is buried underground.

12. The inertial particle separator with heat exchange as recited in claim 11, wherein the variable geometry of the throat of the convergent-divergent nozzle is pneumatically driven.

13. The inertial particle separator with heat exchange as recited in claim 12, further comprising a second annular chamber mounted about the temperature-controlled pipe, a second phase change fluid being received therein, wherein said second heat exchanger is a phase change material heat exchanger in fluid communication with the second annular chamber.

14. The inertial particle separator with heat exchange as recited in claim 13, wherein said second heat exchanger is buried underground.

15. An inertial particle separator with heat exchange, comprising:
- a rotating pipe having an inlet and an outlet, the inlet receiving a mixture of a fluid and particulate matter, wherein rotation of said rotating pipe imparts a tangential velocity to the mixture;
- means for selectively driving rotation of said rotating pipe;
- a first heat exchanger in thermal communication with said rotating pipe for decreasing a first temperature of the mixture when the mixture is flowing through said rotating pipe;
- a convergent-divergent nozzle having an inlet and an outlet, the inlet thereof being connected to the outlet of said rotating pipe for receiving the mixture, wherein said convergent-divergent nozzle accelerates the mixture to a supersonic axial velocity, wherein said convergent-divergent nozzle has a throat having a selectively and controllably variable geometry;
- means for selectively controlling the variable geometry of the throat of the convergent-divergent nozzle;
- a temperature-controlled pipe having an inlet and an outlet, the inlet thereof being connected to the outlet of the convergent-divergent nozzle for receiving the mixture;
- a second heat exchanger in thermal communication with said temperature-controlled pipe for decreasing a second temperature of the mixture when the mixture is flowing through said temperature-controlled pipe; and
- a concentric diffuser having an inlet and an outlet, the inlet thereof being connected to the outlet of said temperature-controlled pipe for receiving the mixture, wherein said concentric diffuser includes at least one outer radial portion and at least one inner radial portion, the particulate matter of the mixture being separated from the fluid of the mixture under centrifugal force thereon, the particulate matter passing through the at least one outer radial portion and the fluid passing through the at least one inner radial portion.

16. The inertial particle separator with heat exchange as recited in claim 15, further comprising a first annular chamber mounted about the rotating pipe, a first phase change fluid being received therein, wherein said first heat exchanger is a phase change material heat exchanger in fluid communication with the first annular chamber.

17. The inertial particle separator with heat exchange as recited in claim 16, wherein said first heat exchanger is buried underground.

18. The inertial particle separator with heat exchange as recited in claim 16, further comprising a second annular chamber mounted about the temperature-controlled pipe, a second phase change fluid being received therein, wherein said second heat exchanger is a phase change material heat exchanger in fluid communication with the second annular chamber.

19. The inertial particle separator with heat exchange as recited in claim 18, wherein said second heat exchanger is buried underground.

* * * * *